(12) United States Patent
Takaya

(10) Patent No.: US 11,481,176 B2
(45) Date of Patent: Oct. 25, 2022

(54) DISPLAY SYSTEM, DISPLAY METHOD, AND RECORDING MEDIUM RECORDING DISPLAY PROGRAM

(71) Applicant: SHARP KABUSHIKI KAISHA, Sakai (JP)

(72) Inventor: Mamoru Takaya, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/409,428

(22) Filed: Aug. 23, 2021

(65) Prior Publication Data

US 2022/0066727 A1 Mar. 3, 2022

(30) Foreign Application Priority Data

Sep. 2, 2020 (JP) .............................. JP2020-147197

(51) Int. Cl.
| | |
|---|---|
| *G06F 3/147* | (2006.01) |
| *G06F 3/14* | (2006.01) |
| *G09G 3/20* | (2006.01) |
| *G09G 5/393* | (2006.01) |

(52) U.S. Cl.
CPC ............ *G06F 3/1446* (2013.01); *G06F 3/147* (2013.01); *G09G 3/20* (2013.01); *G09G 5/393* (2013.01); *G09G 2300/026* (2013.01); *G09G 2340/0464* (2013.01); *G09G 2360/04* (2013.01)

(58) Field of Classification Search
CPC ......... G06F 3/1446; G06F 3/147; G09G 3/20; G09G 5/393
345/1.3
See application file for complete search history.

(56) References Cited

U.S. PATENT DOCUMENTS

| | | | |
|---|---|---|---|
| 2015/0084837 A1* | 3/2015 | Mese ................... | G06F 3/1446 |
| | | | 345/1.3 |
| 2020/0322566 A1* | 10/2020 | Vanman ........... | G08B 13/19665 |
| 2021/0051293 A1* | 2/2021 | Oh ....................... | G06F 3/1446 |

FOREIGN PATENT DOCUMENTS

JP 2012-124759 A 6/2012

* cited by examiner

*Primary Examiner* — Roy P Rabindranath
(74) *Attorney, Agent, or Firm* — ScienBiziP, P.C.

(57) ABSTRACT

A display system includes: a divided image generator grouping divided images obtained by dividing a specific image according to the number of display devices, and generating a plurality of group images; a first image output processor that outputsoutputting, to a predetermined one of the display devices, each of the plurality of group images; a second image output processor outputting a second group image to one of the display devices on a latter stage when a first group image output from a video output device and the second group image output from one of the display devices on a former stage are input; a synthesized image generator extracting, from at least one of the first group image and the second group image, a plurality of the divided images to be displayed by a corresponding one of the display devices, and generating a synthesized image; and a display processor displaying the synthesized image.

9 Claims, 11 Drawing Sheets

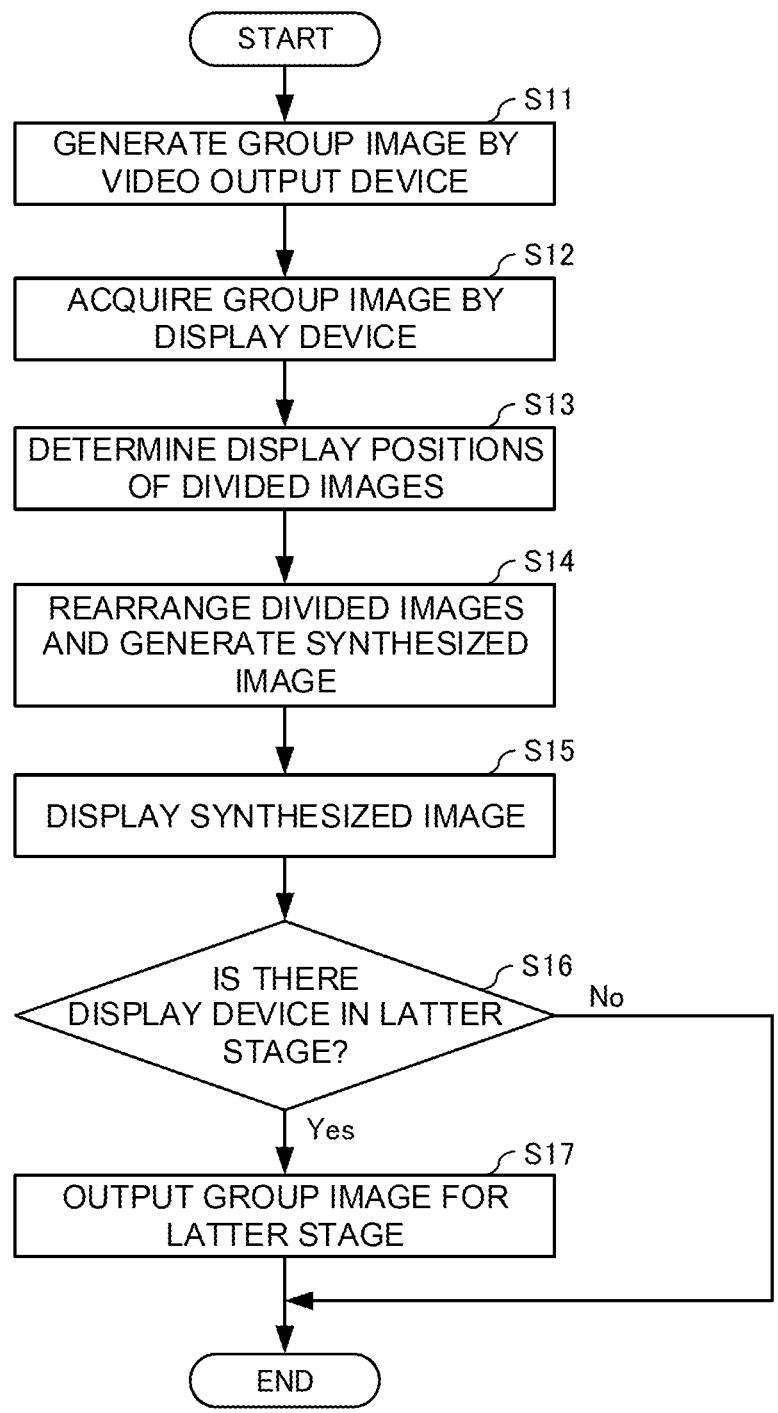

DISPLAY SYSTEM, DISPLAY METHOD, AND RECORDING MEDIUM RECORDING DISPLAY PROGRAM

INCORPORATION BY REFERENCE

This application is based upon and claims the benefit of priority from the corresponding Japanese Patent Application No. 2020-147197 filed on Sep. 2, 2020, the entire contents of which are incorporated herein by reference.

BACKGROUND

The present disclosure relates to a display system, a display method, and a recording medium recording a display program for displaying an image by a single display device by means of a plurality of image signals.

Conventionally, there is proposed a system that includes a plurality of display devices (displays) daisy-chained to each other, and displays a video content on each of the display devices. For example, JP 2012-124759 discloses a technology of dividing a video content into video information to be displayed on each display device in accordance with connection information of a plurality of the display devices, transmits a video signal including divided video information to each display device, transfers the video signal to the display device in a latter stage by each display device, and extracting and displaying video information to be displayed by the own devices among from the video signals.

When a high resolution video signal is displayed on a display device corresponding to low resolution, a method for inputting, from a video output device to each display device, a low resolution divided video signal obtained by division of the high resolution video signal, and displaying a high resolution video content on the whole of the plurality of display devices is considered. However, in this method, when the number of display devices does not correspond to the number of outputs of the video output device, equipment such as a distributor that distributes the video signals output from the video output device is required, and a problem of complicating the system configuration and increasing the cost arises.

SUMMARY

An object of the present disclosure is to provide a display system, a display method, and a recording medium recording a display program that are capable of displaying a high resolution video content by means of a plurality of display devices corresponding to low resolution without complicating a system configuration and increasing a cost.

A display system according to an aspect of the present disclosure is a display system that displays a specific image on a plurality of display devices by means of a plurality of image signals output from a video output device, and includes: a divided image generator that divides the specific image into a plurality of divided images according to the number of the plurality of display devices, groups the plurality of divided images into a plurality of groups, and generates a plurality of group images; a first image output processor that outputs, to a predetermined one of the plurality of display devices, each of the plurality of group images generated by the divided image generator; a second image output processor that outputs a second group image to one of the plurality of display devices on a latter stage when a first group image output from the video output device by the first image output processor and the second group image output from one of the plurality of display devices on a former stage are input; a synthesized image generator that extracts, from at least one of the first group image and the second group image, a plurality of the divided images to be displayed by a corresponding one of the plurality of display devices, rearranges each of the extracted divided images in accordance with a divided display area of the corresponding one of the plurality of display devices, and generates a synthesized image; and a display processor that displays the synthesized image generated by the synthesized image generator.

A display method according to another aspect of the present disclosure is a display method for displaying a specific image on a plurality of display devices by means of a plurality of image signals output from a video output device, and the display method for causing one or a plurality of processors to execute: dividing the specific image into a plurality of divided images according to the number of the plurality of display devices, grouping the plurality of divided images into a plurality of groups, and generating a plurality of group images; first image outputting of outputting, to a predetermined one of the plurality of display devices, each of the plurality of group images generated in the divided image generation; second image outputting of outputting a second group image to one of the plurality of display devices on a latter stage when a first group image output from the video output device in the first image outputting and the second group image output from one of the plurality of display devices on a former stage are input; extracting, from at least one of the first group image and the second group image, a plurality of the divided images to be displayed by a corresponding one of the plurality of display devices, rearranging each of the extracted divided images in accordance with a divided display area of the corresponding one of the plurality of display devices, and generating a synthesized image; and displaying the synthesized image generated in the synthesized image generation.

A recording medium according to another aspect of the present disclosure is a non-transitory computer readable recording medium that records a display program that displays a specific image on a plurality of display devices by means of a plurality of image signals output from a video output device, the display program for causing one or a plurality of processors to execute: dividing the specific image into a plurality of divided images according to the number of the plurality of display devices, grouping the plurality of divided images into a plurality of groups, and generating a plurality of group images; first image outputting of outputting, to a predetermined one of the plurality of display devices, each of the plurality of group images generated in the divided image generation; second image outputting of outputting a second group image to ce one of the plurality of display devices on a latter stage when a first group image output from the video output device in the first image outputting and the second group image output from one of the plurality of display devices on a former stage are input; extracting, from at least one of the first group image and the second group image, a plurality of the divided images to be displayed by a corresponding one of the plurality of display devices, rearranging each of the extracted divided images in accordance with a divided display area of the corresponding one of the plurality of display devices, and generating a synthesized image; and displaying the synthesized image generated in the synthesized image generation.

According to the present disclosure, it is possible to display a high resolution video content by means of a plurality of display devices corresponding to low resolution without complicating a system configuration and increasing a cost.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4A is a diagram illustrating an example of divided images generated by a video output device according to the embodiment of the present disclosure.

FIG. 4B is a diagram illustrating an example of group images generated by the video output device according to the embodiment of the present disclosure.

FIG. 8 is a flowchart illustrating an example of a procedure of a display process performed in the display system according to the embodiment of the present disclosure.

FIG. 10A is a diagram illustrating an example of divided images generated by a video output device according to another embodiment of the present disclosure.

FIG. 10B a diagram illustrating an example of group images generated by a video output device according to another embodiment of the present disclosure.

DETAILED DESCRIPTION

Hereinafter, an embodiment of the present disclosure will be described with reference to the attached drawings. The following embodiments are examples embodying the present disclosure, and do not intend to limit the technical scope of the present disclosure.

Figure 1:
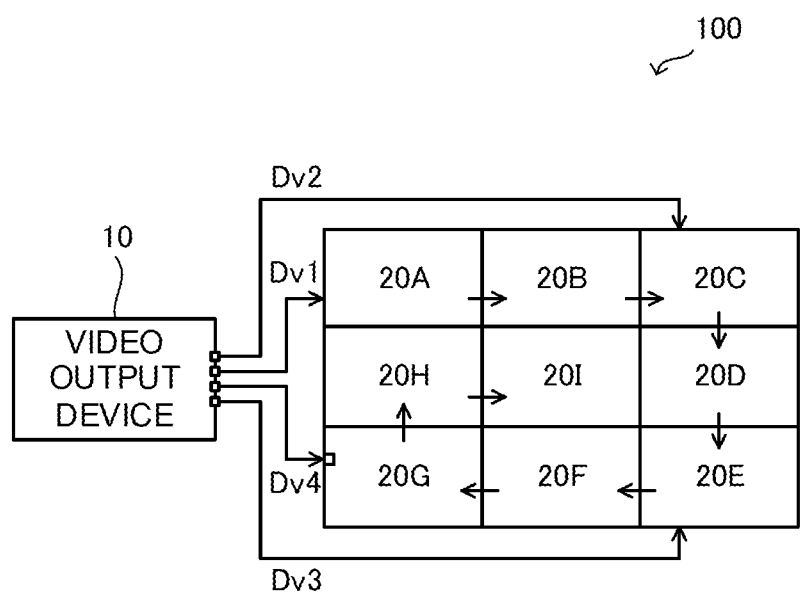
FIG. 1 is a diagram illustrating a schematic configuration of a display system according to an embodiment of the present disclosure.

FIG. 1 is a diagram illustrating a schematic configuration of a display system 100 according to an embodiment of the present disclosure.

The display system 100 includes a single video output device 10, and a plurality of display devices 20. The video output device 10 is composed of, for example, a personal computer (PC), an image reproduction device, or the like. The video output device 10 outputs an image (video content) to be displayed on each display device 20 as an image signal Dv (video signal). The plurality of display devices 20 are disposed in a daisy-chain connection such that the image signals Dv input from the video output device 10 are transmitted from an upstream to a downstream. FIG. 1 illustrates nine display devices 20A, 20B, 20C, 20D, 20E, 20F, 20G, 20H and 20I as an example. For example, the display device 20A is disposed on the most upstream side, and the display devices 20B, 20C, 20D, 20E, 20F, 20G, 20H and 20I are disposed in this order toward the downstream side, and the display devices 20A to 20I are daisy-chained. The number of the display devices 20 is not limited. Each display device 20 may be a liquid crystal display device, an organic EL display device, or any other type of display device.

The video output device 10 outputs a video signal having high resolution (for example, 8K: 7680×4320 pixels) (an example of first resolution of the present disclosure). Each display device 20 is a display corresponding to a video signal having low resolution (for example, 4K: 3840×2160 pixels) (an example of second resolution of the present disclosure). That is, the display device 20 is a display that corresponds to resolution lower than the resolution of the video signal output by the video output device 10. The display system 100 displays a video content on a plurality of display devices 20 by means of a plurality of image signals Dv output from the video output device 10. For example, the display system 100 displays a high resolution video content by means of a plurality of the low resolution display devices 20.

The video output device 10 is provided with four output terminals that are connected to the four respective display devices 20 different from each other, and outputs the image signal Dv from each of the four output terminals. For example, the video output device 10 divides an image having high resolution (7680×4320 pixels) into images each having four low resolution (3840×2160 pixels) and outputs the divided images to the display device 20 from each of the four output terminals (output ports). The display device 20 is provided with a plurality of input terminals (input ports) for connecting a plurality of signal lines. Each of the input terminals is an HDMI (High-Definition Multimedia Interface, HDMI: registered trademark) terminal, a DP (DisplayPort) terminal, or a DVI (Digital Visual Interface) terminal, or the like. The video output device 10 and the display device 20A, the video output device 10 and the display device 20C, the video output device 10 and the display device 20E, and the video output device 10 and the display device 20G are connected to each other by the respective signal lines (cables). An image signal Dv1 (video signal) corresponding to a low resolution (3840×2160 pixels) image output from the video output device 10 is input to the display device 20A via the signal line, and an image signal Dv2 output from the video output device 10 is input to the display device 20C via the signal line, an image signal Dv3 corresponding to the above low resolution image output from the video output device 10 is input to the display device 20E via the signal line, and the image signal Dv4 corresponding to the above low resolution image output from the video output device 10 is input to the display device 20G via the signal line.

Figure 2:
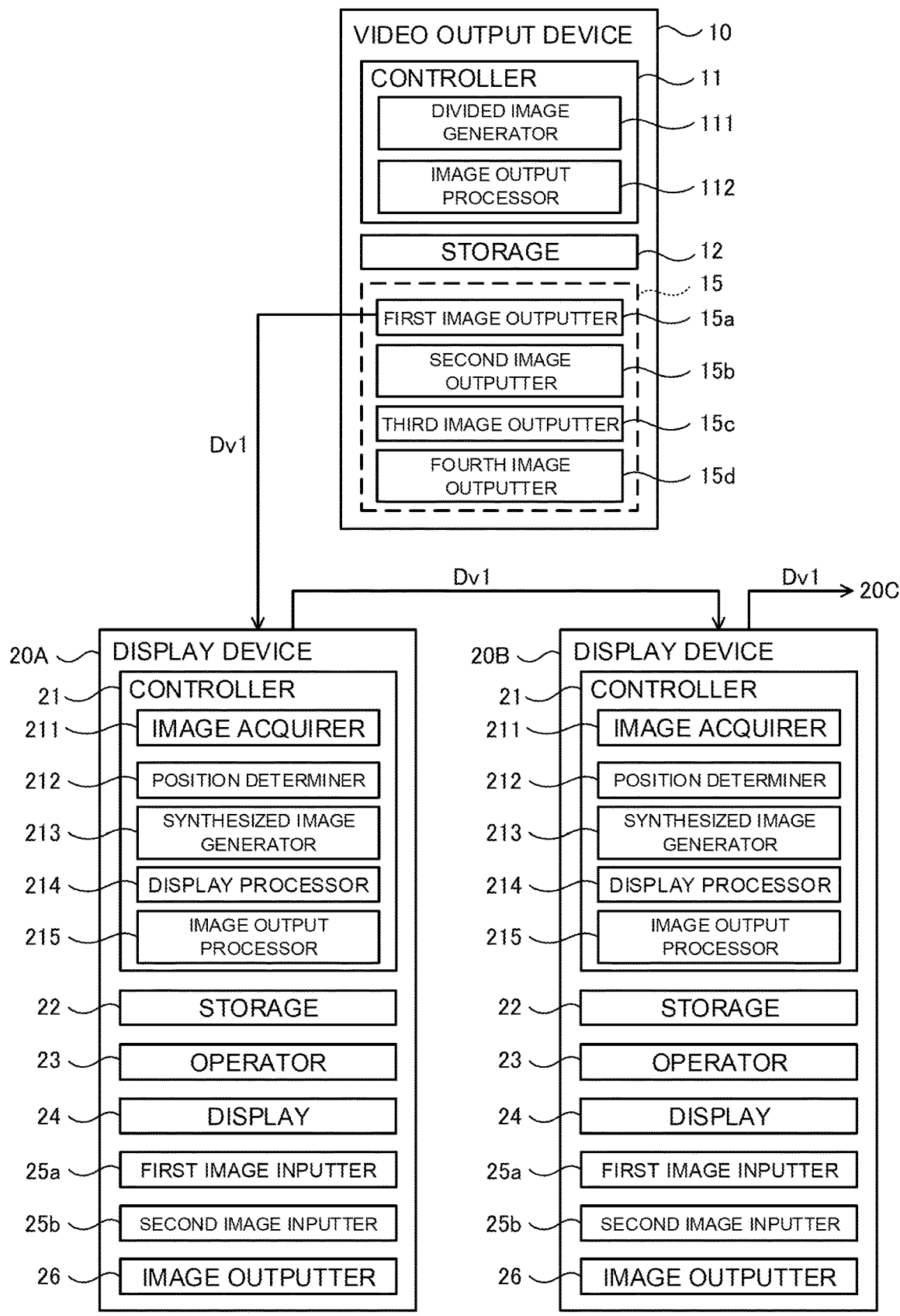
FIG. 2 is a block diagram illustrating a specific configuration of the display system according to the embodiment of the present disclosure.
Figure 3:
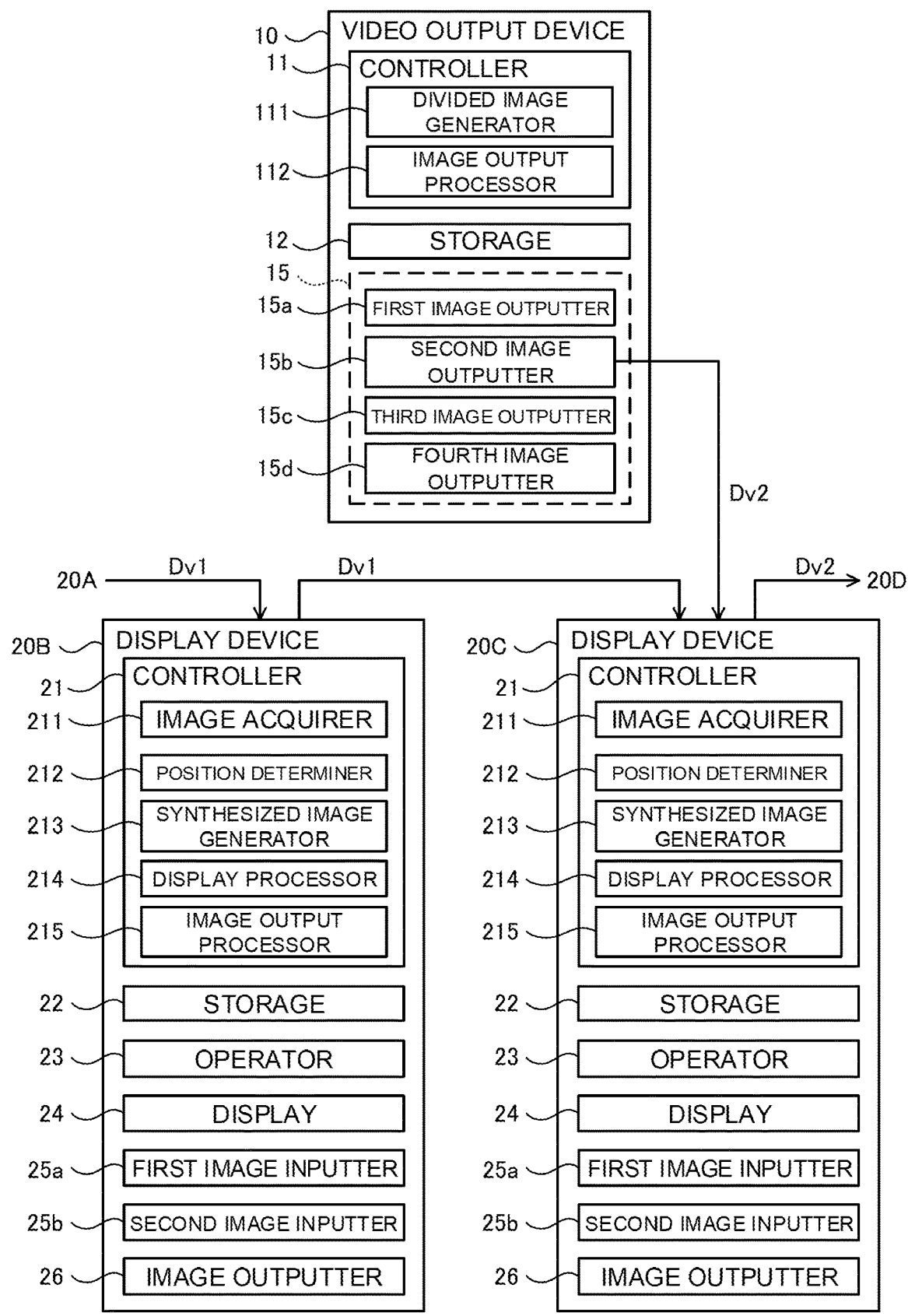
FIG. 3 is a block diagram illustrating a specific configuration of the display system according to the embodiment of the present disclosure.

Video Output Device 10 FIG. 2 and FIG. 3 each illustrate a functional block diagram of the video output device 10. The image output device 10 includes a controller 11, a storage 12, an image outputter 15, and the like.

The storage 12 is a non-volatile storage such as a flash memory, an HDD (Hard Disk Drive) and an SSD (Solid State Drive) that store various types of information. The storage 12 stores a control program such as a display control program for causing the controller 11 to execute a display process (see FIG. 8) described below. For example, the display control program is recorded on a computer-readable recording medium such as a USB, a CD and a DVD in a non-transitory manner, and is read by a reading device (not illustrated) provided by the video output device 10 and is stored in the storage 12.

The image outputter 15 includes a plurality of image outputters, and each of the image outputters is connected to the output terminal. Herein, four image outputters 15a to 15d are illustrated. Each of the image outputters 15a to 15d outputs a corresponding divided image signal to each signal line.

The controller 11 has control devices such as a CPU, a ROM, and a RAM. The CPU is a processor that executes various types of arithmetic processes. The ROM stores a control program in advance, such as BIOS and OS, etc. for causing the CPU to execute various types of processes. The RAM stores various information and is used as a temporary storage memory (work area) for the various processes executed by the CPU. The controller 11 controls the video output device 10 by causing the CPU to execute various control programs stored in the ROM or the storage 12 in advance.

Specifically, the controller 11 includes various processors such as a divided image generator 111 and an image output processor 112. The control unit 11 functions as the various types of processors by causing the CPU to execute various types of processes according to the control program. Furthermore, some or all of the processors included in the control unit 11 may be configured with an electronic circuit. The display control program may be a program for causing a plurality of processors to function as the various processors described above.

The divided image generator 111 divides an image P0 (specific image) corresponding to the video content into a plurality of divided images corresponding to the number of the display devices 20, groups the plurality of divided images into a plurality of groups, and generates a plurality of group images P. Specifically, the divided image generator 111 generates the plurality of group images P obtained by dividing the single image P0 (specific image) in accordance with the number of the output terminals. For example, the divided image generator 111 generates four group images corresponding to four output terminals for each frame. Herein, the divided image generator 111 generates four group images P1 to P4 capable of displaying the video content on the nine display devices 20A to 20I. The divided image generator 111 is an example of a divided image generator of the present disclosure.

Figures 4A, 4B:
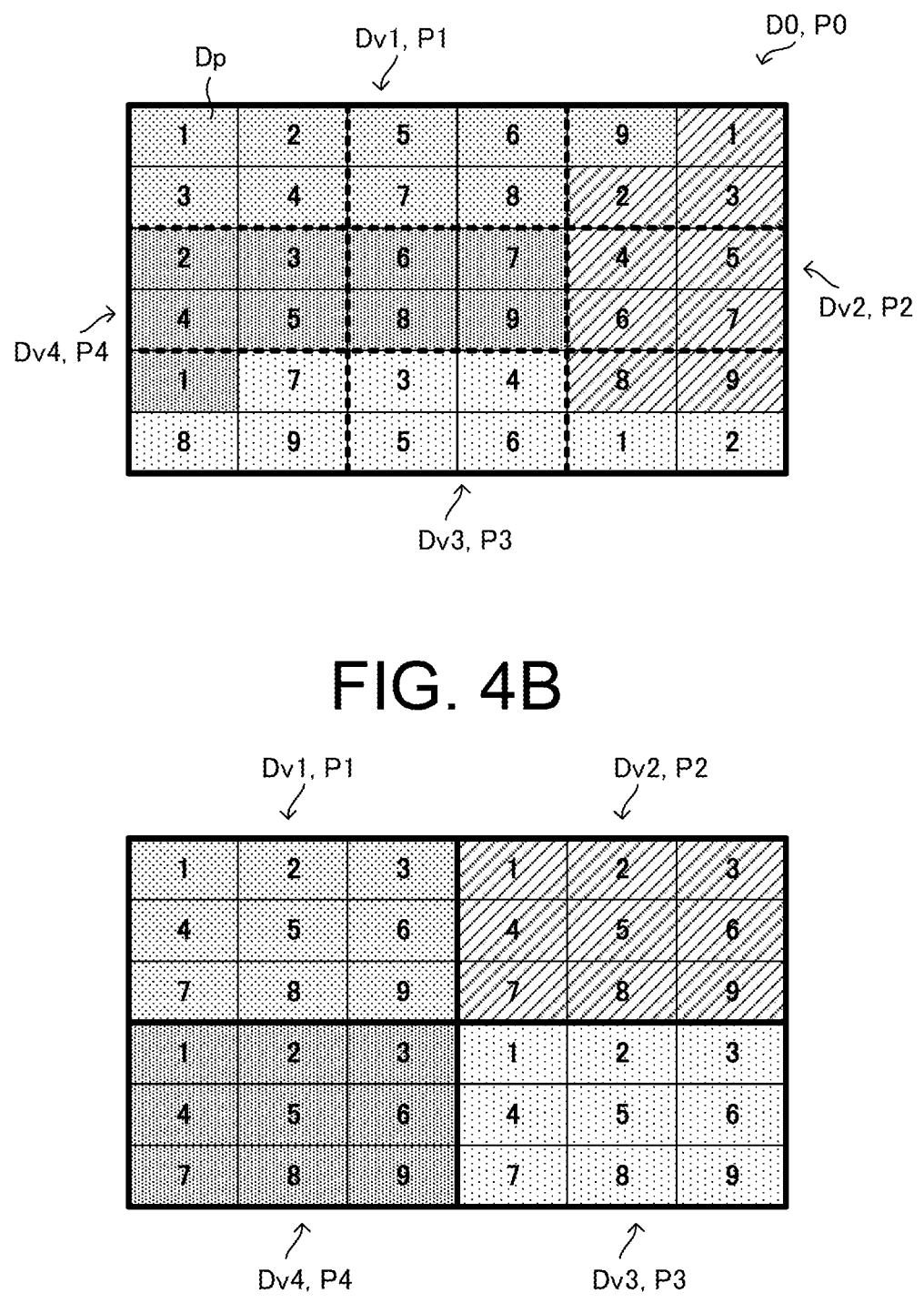

FIG. 4A and FIG. 4B are diagrams each illustrating an example of a generation method of the group images P1 to P4. First, the divided image generator 111 divides the image P0 (video content) corresponding to a video signal D0 having low resolution (7680×4320 pixels) into 36 segments (6×6) as illustrated in FIG. 4A. Each divided image Dp is equivalent to 1280×720 pixels (an example of third resolution of the present disclosure). When the image P0 is divided into the 36 segments, each of the four group images P1 to P4 consists of nine divided images Dp. That is, the divided image generator 111 divides the image P0 having the first resolution into the divided images Dp having the third resolution lower than the second resolution, groups the plurality of the divided images Dp, and generates the group images P having the second resolution. Each of the nine display devices 20A to 20I includes four divided display areas, and the single divided image Dp is assigned to each divided display area.

Next, the divided image generator 111 assigns display position information corresponding to the above divided display area to each divided image Dp. Herein, the above display position information is represented by the numbers "1 to 9". The divided image generator 111 assigns the display position information so as to include the respective divided images Dp to be displayed by the display devices 20. For example, the display devices 20A is disposed at the upper left and displays the upper left of the image P0, and the display device 20B is disposed at the upper center and displays the upper center of the image P0, and therefore the divided image generator 111 assigns the numbers "1" to "4" corresponding to the display device 20A to the four divided images Dp at the upper left and assigns the numbers "5" to "8" corresponding to the display device 20B to the four divided images Dp at the upper center. The divided image generator 111 assigns the number "9" corresponding to the display device 20C to the remaining divided images Dp that composes the group image P1.

The display device 20C is disposed at the upper right and displays the upper right of the image P0, and the display device 20D is disposed at the center right and displays the center right of the image P0, and therefore the divided image generator 111 assigns the numbers "1" to "3" corresponding to the display device 20C to the three divided images Dp at the upper right, and assigns the numbers "4" to "7" corresponding to the display device 20D to the four divided images Dp at the center right. The divided image generator 111 assigns the numbers "8" and "9" corresponding to the display device 20E to the remaining divided images Dp that composes the group image P2.

The display device 20E is disposed at the lower right and displays the lower right of the image P0, and the display device 20F is disposed at the lower center and displays the lower center of the image P0, and therefore the divided image generator 111 assigns the numbers "1" and "2" corresponding to the display device 20E to the two divided images Dp at the lower right, and assigns the numbers "3" to "6" corresponding to the display device 20F to the four divided images Dp at the lower center. The divided image generator 111 assigns the numbers "7" to "9" corresponding to the display device 20G to the remaining divided images Dp that composes the group image P3.

The display device 20G is disposed at the lower left and displays the lower left of the image P0, the display device 20H is disposed at the left center and displays the left center of the image P0, and the display device 20I is disposed at the center and displays the center of the image P0, and therefore the divided image generator 111 assigns the number "1" corresponding to the display device 20G to the one divided image Dp at the lower left, assigns the numbers "2" to "5" corresponding to the display device 20H to the four divided images Dp at the left center, and assigns the numbers "6" to "9" corresponding to the display device 20I to the four divided images Dp at the center.

Next, the divided image generator 111 generates the four group images P1 to P4 illustrated in FIG. 4B on the basis of the divided images Dp illustrated in FIG. 4A. Specifically, the divided image generator 111 rearranges the divided images Dp on the basis of the number assigned to each divided image Dp, and generates the group images P1 to P4 with the resolution corresponding to each display device 20. Herein, as illustrated in FIG. 4B, the divided image generator 111 generates the image signal Dv1 of the group image P1 having 3840×2160 pixels, the image signal Dv2 of the group image P2 having 3840×2160 pixels, the image signal Dv3 of the group image P3 having 3840×2160 pixels, and the image signal Dv4 of the group image P4 having 3840×2160 pixels.

Figure 5A:
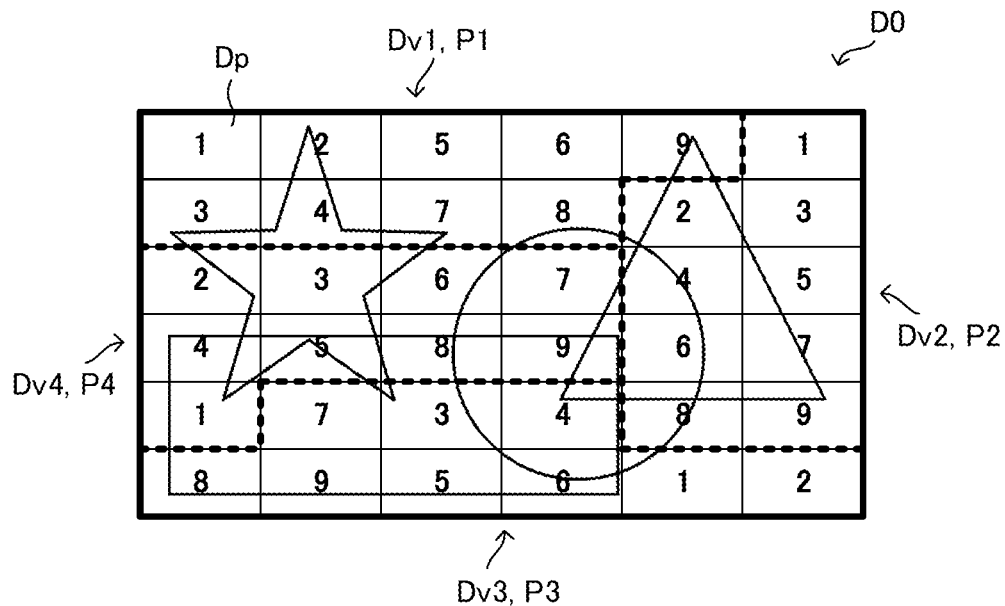
FIG. 5A is a diagram illustrating a specific example of divided images generated by the video output device according to the embodiment of the present disclosure.
Figure 5B:
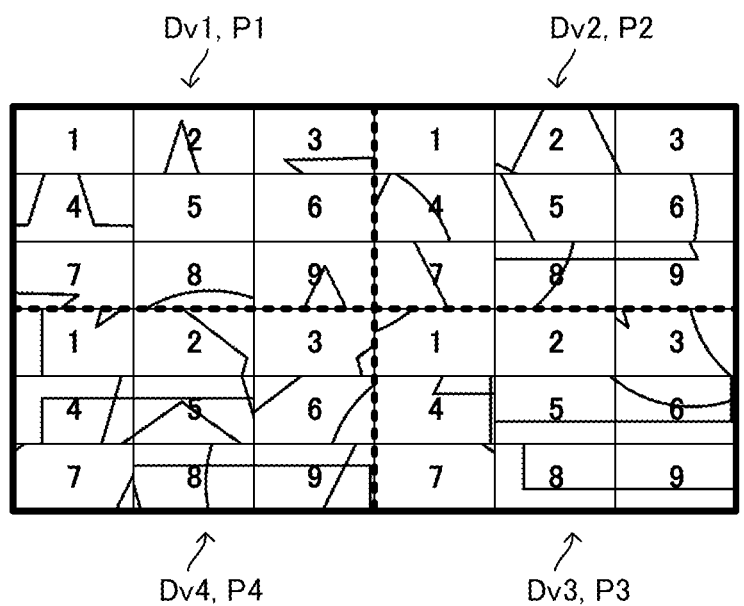
FIG. 5B is a diagram illustrating a specific example of group images generated by the video output device according to the embodiment of the present disclosure.

FIG. 5A and FIG. 5B each illustrate a specific example of the video content. FIG. 5A corresponds to FIG. 4A, and FIG. 5B corresponds to FIG. 4B.

The image output processor 112 causes the corresponding image outputter 15 to output each of the group images P1 to P4 generated by the divided image generator 111 to the predetermined display device 20. Specifically, the image output processor 112 causes the first image outputter 15a to output the image signal Dv1 corresponding to the group image P1 to the display device 20A, causes the second image outputter 15b to output the image signal Dv2 corresponding to the group image P2 to the display device 20C, causes the third image outputter 15c to output the image signal Dv3 corresponding to the group image P3 to the display device 20E, and causes the fourth image outputter 15d to output the image signal Dv4 corresponding to the group image P4 to the display device 20G (see FIG. 1). The image output processor 112 is an example of a first image output processor of the present disclosure.

Display Devices 20 FIG. 2 and FIG. 3 each illustrate a functional block diagram of the display devices 20. The display devices 20 each include a controller 21, a storage 22, an operator 23, a display 24, an image inputter 25, and the like. The display devices 20 have the same configuration.

The operator 23 is a mouse, a keyboard, a touch panel, or the like which receives operation by a user using the display device 20. The display unit 24 is a display panel such as a liquid crystal display or an organic EL display that displays various types of information. The operator 23 and the display 24 may be an integrally formed user interface.

The storage 22 is a non-volatile storage such as a flash memory, an HDD (Hard Disk Drive) and an SSD (Solid State Drive) that store various types of information. The storage 22 stores a control program such as a display control program for causing the controller 21 to execute a display process (see FIG. 8) described below. For example, the display control program is recorded on a computer-readable recording medium such as a USB, a CD and a DVD in a non-transitory manner, and is read by a reading device (not illustrated) provided by the video output device 20 and is stored in the storage 22.

The image inputter 25 includes a plurality of image inputters, and each of the image inputters is connected to an input terminal. Herein, two image inputters 25a and 25b are illustrated. At least one of the image signal Dv output from the video output device 10 and the image signal Dv output from the display device 20 in the former stage is input to the image inputters 25a and 25b.

An image outputter 26 is connected to an output terminal, and outputs the image signal Dv to the display device 20 in the latter stage.

Figure 6:
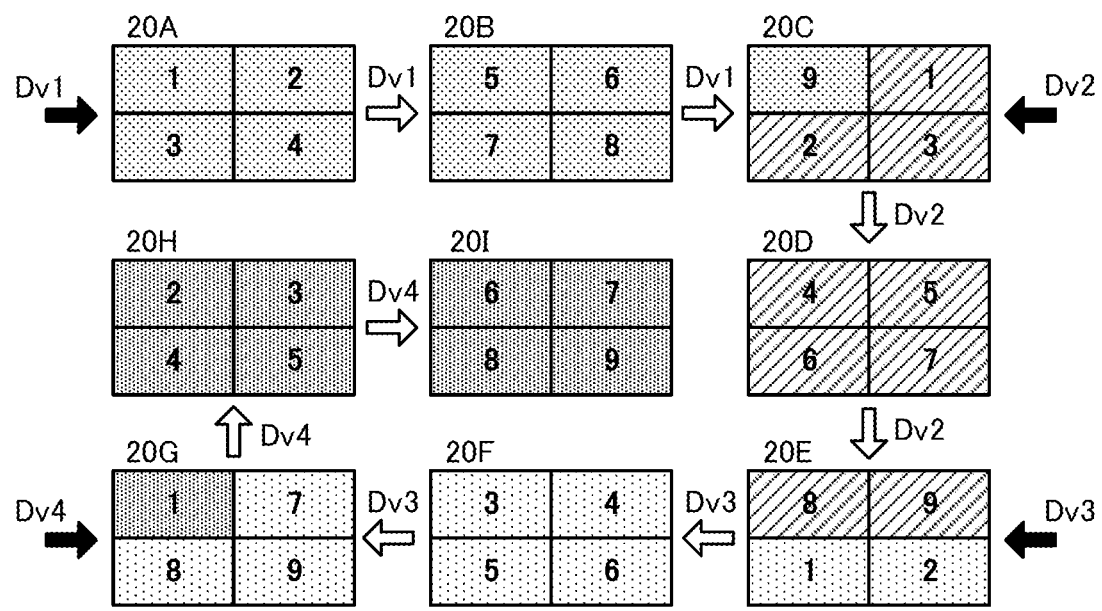
FIG. 6 is a diagram schematically illustrating a state of input/output of image signals in the display devices according to the embodiment of the present disclosure.

FIG. 6 schematically illustrates a state of input/output of the image signals Dv in the display devices 20A to 20I.

For example, the image signal Dv1 output from the first image outputter 15a of the video output device 10 is input to the first image inputter 25a of the display device 20A (see black arrow). The image outputter 26 of the display device 20A outputs the image signal Dv1 to the display device 20B in the latter stage. The image signal Dv1 output from the image outputter 26 of the display device 20A is input to the first image inputter 25a of the display device 20B. The image outputter 26 of the display device 20B outputs the image signal Dv1 to the display device 20C in the latter stage.

The image signal Dv1 output from the image outputter 26 of the display device 20B is input to the first image inputter 25a of the display device 20C, and the image signal Dv2 output from the second image outputter 15b of the video output device 10 is input to the second image inputter 25b of the display device 20C (see black arrow). The image outputter 26 of the display device 20C outputs the image signal Dv2 to the display device 20D in the latter stage. The image signal Dv2 output from the image outputter 26 of the display device 20C is input to the first image inputter 25a of the display device 20D. The image outputter 26 of the display device 20D outputs the image signal Dv2 to the display device 20E in the latter stage.

The image signal Dv2 output from the image outputter 26 of the display device 20D is input to the first image inputter 25a of the display device 20E, and the image signal Dv3 output from the third image outputter 15c of the image output device 10 is input to the second image inputter 25b of the display device 20E (see black arrow). The image outputter 26 of the display device 20E outputs the image signal Dv3 to the display device 20F in the latter stage. The image signal Dv3 output from the image outputter 26 of the display device 20E is input to the first image inputter 25a of the display device 20F. The image outputter 26 of the display device 20F outputs the image signal Dv3 to the display device 20G in the latter stage.

The image signal Dv3 output from the image outputter 26 of the display device 20F is input to the first image inputter 25a of the display device 20G, and the image signal Dv4 output from the fourth image outputter 15d of the image output device 10 is input to the second image inputter 25b of the display device 20G (see black arrow). The image outputter 26 of the display device 20G outputs the image signal Dv4 to the display device 20H in the latter stage. The image signal Dv4 output from the image outputter 26 of the display device 20G is input to the first image inputter 25a of the display device 20H. The image outputter 26 of the display device 20H outputs the image signal Dv4 to the display device 20I in the latter stage. The image signal Dv4 output from the image outputter 26 of the display device 20H is input to the first image inputter 25a of the display device 20I.

Each controller 21 has control devices such as a CPU, a ROM, and a RAM, and the like. The CPU is a processor that executes various types of arithmetic processes. The ROM stores a control program in advance, such as BIOS and OS, etc. for causing the CPU to execute various types of processes. The RAM stores various information and is used as a temporary storage memory (work area) for the various processes executed by the CPU. The controller 21 controls the display device 20 by causing the CPU to execute various control programs stored in the ROM or the storage 22 in advance.

Specifically, each controller 21 includes various processors such as an image acquirer 211, a position determiner 212, a synthesized image generator 213, a display processor 214, and an image output processor 215. The control unit 21 functions as the various types of processors by causing the CPU to execute various types of processes according to the control program. Furthermore, some or all of the processors included in the control unit 21 may be configured by an electronic circuit. The display control program may be a program for causing a plurality of processors to function as the various processors described above.

Each image acquirer 211 acquires the group image P (see FIG. 4B and FIG. 5B) corresponding to the image signal Dv input from the video output device 10 or the display device 20 in the former stage.

Specifically, the image acquirer 211 of the display device 20A acquires the group image P1 (see FIG. 4B and FIG. 5B) corresponding to the image signal Dv1 from the video output device 10. The image acquirer 211 of the display device 20B acquires the group image P1 from the display device 20A. The image acquirer 211 of the display device 20C acquires the group image P1 from the display device 20B and acquires the group image P2 (see FIG. 4B and FIG. 5B) corresponding to the image signal Dv2 from the video output device 10. The image acquirer 211 of the display device 20D acquires the group image P2 from the display device 20C. The image acquirer 211 of the display device 20E acquires the group image P2 from the display device 20D and acquires the group image P3 (see FIG. 4B and FIG. 5B) corresponding to the image signal Dv3 from the video output device 10. The image acquirer 211 of the display device 20F acquires the group image P3 from the display device 20E. The image acquirer 211 of the display device 20G acquires the group image P3 from the display device 20F and acquires the group image P4 (see FIG. 4B and FIG. 5B) corresponding to the image signal Dv4 from the video output device 10. The image acquirer 211 of the display device 20H acquires the group image P4 from the display device 20G. The image acquirer 211 of the display device 20I acquires the group image P4 from the display device 20H.

Each position determiner 212 determines the display positions of the plurality of divided images Dp (see FIGS. 4A and 5A) on the basis of the group image P acquired by the image acquirer 211.

Specifically, the position determiner 212 determines the display position of each divided image Dp included in the group image P by referring to the above display position information assigned to each divided image Dp.

Figure 7A:
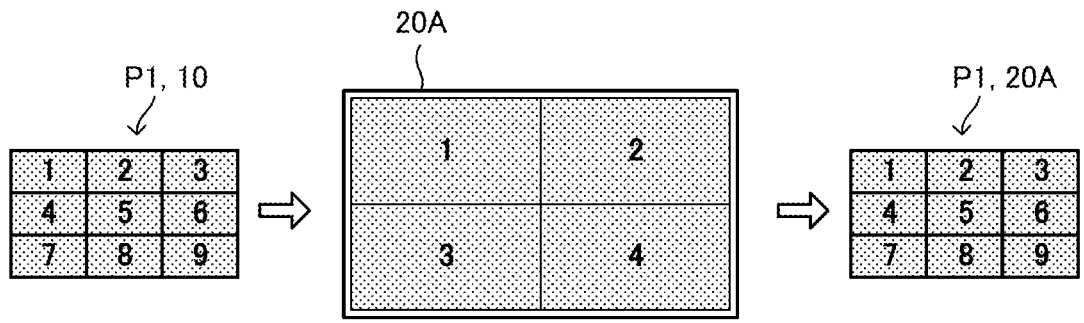
FIG. 7A is a diagram illustrating an example of a synthesized image in the display device according to the embodiment of the present disclosure.
Figure 7B:
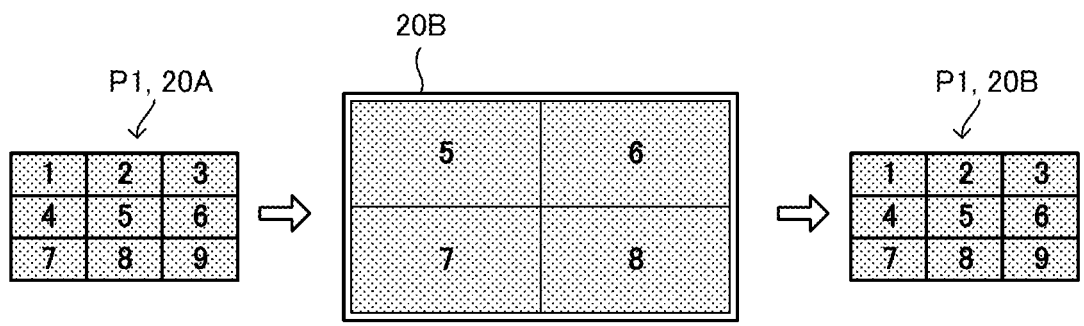
FIG. 7B is a diagram illustrating an example of the synthesized image in the display device according to the embodiment of the present disclosure.

For example, as illustrated in FIG. 7A, the position determiner 212 of the display device 20A determines the display position of each divided image Dp by referring to the above display position information ("1" to "9") assigned to each of the nine divided images Dp included in the group image P1 acquired by the image acquirer 211. Similarly, as illustrated in FIG. 7B, the position determiner 212 of the display device 20B determines the display position of each divided image Dp by referring to the above display position information ("1" to "9") assigned to each of the nine divided images Dp included in the group image P1 acquired by the image acquirer 211.

Figure 7C:
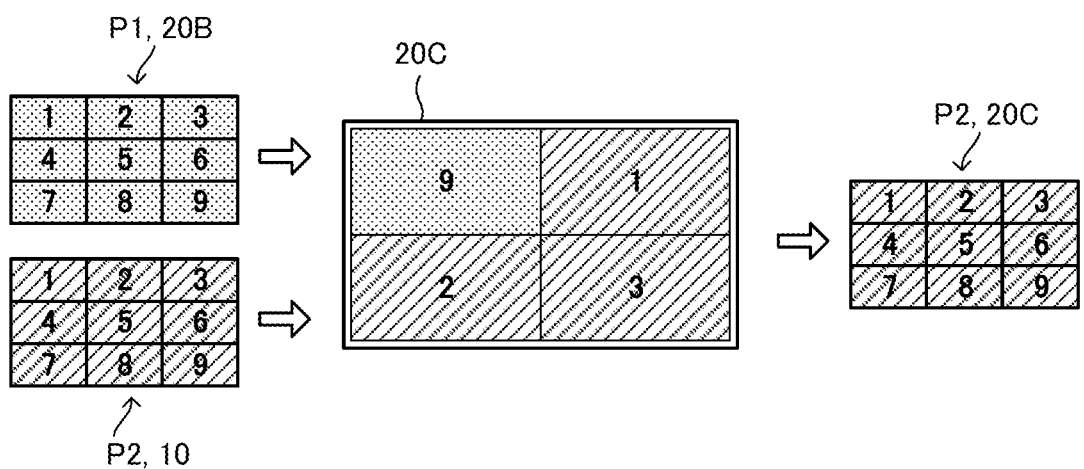
FIG. 7C is a diagram illustrating an example of the synthesized image in the display device according to the embodiment of the present disclosure.

Also, for example, as illustrated in FIG. 7C, the position determiner 212 of the display device 20C determines the display position of each divided image Dp by referring to the display position information ("1" to "9") assigned to each of the nine divided images Dp included in the group image P1 acquired by the image acquirer 211, and determines the display position of each divided image Dp by referring to the above display position information ("1" to "9") assigned to each of the nine divided images Dp included in the group image P2 acquired by the image acquirer 211.

Each synthesized image generator 213 extracts a plurality of the divided images Dp to be displayed by the display device 20 from at least one of the group image P1 and the group image P2, rearranges the extracted divided images according to the divided display areas of the display device 20, and generates a synthesized image. For example, the synthesized image generator 213 extracts the four divided images Dp to be displayed by the display device 20 from the group image P on the basis of a determination result of the position determiner 212, rearrange the extracted divided images in accordance with the divided display areas of the display device 20, and generates a single synthesized image. The synthesized image generator 213 is an example of a synthesized image generator of the present disclosure.

For example, as illustrated in FIG. 7A, the synthesized image generator 213 of the display device 20A extracts, from the nine divided images Dp included in the group image P1, the four divided images Dp to which the above display position information "1" to "4" are assigned, rearranges the extracted divided images to positions assigned to the four divided display areas of the display device 20A, and generates a single synthesized image. Similarly, as illustrated in FIG. 7B, the synthesized image generator 213 of the display device 20B extracts, from the nine divided images Dp included in the group image P1, the four divided images Dp to which the above display position information "5" to "8" are assigned, and rearranges the extracted divided images to positions assigned to the four divided display areas of the display device 20B, and generates a single synthesized image.

As illustrated in FIG. 7C, the synthesized image generator 213 of the display device 20C extracts, from the nine divided images Dp included in the group image P1, the one divided image Dp to which the above display position information "9" is assigned, extracts, from the nine divided images Dp included in the group image P2, the three divided images Dp to which the above display position information "1" to "3" are assigned, rearranges the extracted divided images to positions assigned to the four divided display areas of the display device 20C, and generates a single synthesized image.

In a similar manner for the other display devices 20D to 20I, each synthesized image generator 213 extracts four divided images Dp to be displayed from the group image P and generates a single synthesized image. In the display devices 20C, 20E, 20G in which the two group images P are input, each synthesized image generator 213 extracts, from the two group images P, the four divided images Dp to be displayed and generates a single synthesized image.

Thus, each synthesized image generator 213 extracts, from the plurality of divided images Dp included in the group image P, the plurality of divided images Dp to which the above display position information corresponding to a corresponding display device 20 is assigned, rearranges the extracted divided images to the positions assigned to a plurality of the above divided display areas of the corresponding display device 20, and generates a synthesized image. In each display device 20 in which the first group image output from the video output device 10 and the second group image output from the display device 20 in the former stage are input, the synthesized image generator 213 extracts, from the plurality of divided images Dp included in the first group image, the one or plurality of divided images Dp to which the display position information corresponding to the display device 20 is assigned, extracts, from the plurality of divided images Dp included in the second group image, the one or plurality of divided images Dp to which the display position information corresponding to the display device 20 is assigned, rearranges the extracted divided images to the positions assigned to a plurality of the above divided display areas of the corresponding display device 20, and generates a synthesized image.

Each display processor 214 displays, on the display 24, the above synthesized image generated by the synthesized image generator 213. The display processor 214 is an example of a display processor according to the present disclosure.

Each image output processor 215 outputs, from the image outputter 26 to the display device 20 in the latter stage, the image signal Dv corresponding to the group images P acquired by the image acquirer 211. For example, the image output processor 215 of the display device 20A causes output of the image signal Dv1 input from the video output device 10 to the display device 20B in the latter stage. Additionally, the image output processor 215 of the display device 20B causes output of the image signal Dv1 input from the display device 20A to the display device 20C in the latter stage.

Herein, in the display device 20 in which the image signal Dv is input from the display device 20 in the former stage to the first image inputter 25a and the image signal Dv is input from the video output device 10 to the second image inputter 25b, the image output processor 215 causes output of the image signal Dv input from the video output device 10 to the display device 20 in the latter stage For example, the image output processor 215 of the display device 20C causes output of the image signal Dv2 to the display device 20D in the latter stage when the image signal Dv1 is input from the display device 20B in the former stage and the image signal Dv2 is input from the video output device 10 (see FIG. 6). Thus, the image output processor 215 outputs the second group image to the display device 20 in the latter stage when the first group image output from the video output device 10 and the second group image output from the display device 20 in the former stage are input. The image output processor 215 is an example of a second image output processor of the present disclosure.

Display Process Hereinafter, an example of a procedure of a display process performed in the display system 100 will be described with reference to FIG. 8.

The present invention can be regarded as an invention of a display method (display method of the present invention) for executing one or a plurality of steps included in the display process described above. In addition, the one or plurality of steps included in the above display process described herein may be omitted as appropriate. The order of execution of each step in the above display process may be different to the extent that the same effect is produced. Furthermore, although a case where each step in the display process is executed by the controller 11 of the video output device 10 and the controller 21 of each display device 20 will be described herein as an example, in other embodiments, each step in the display process may be executed by a plurality of processors in a distributed manner.

First, in Step S11, the controller 11 of the video output device 10 generates a group image corresponding to each display device 20. Specifically, the controller 11 generates a plurality of group images for displaying a high resolution video content on the plurality of display devices 20 corresponding to low resolution in accordance with the number of display devices 20. Herein, the system is configured such that the video output device 10 outputs video signals (group images) from the four output terminals and the video content is displayed by the nine display devices 20, and therefore the controller 11 divides the image P0 corresponding to the video content into the thirty-six segments (see FIG. 4A and FIG. 5A). Then, the controller 11 rearranges the thirty-six divided images Dp, and generates the four group images P1 to P4, each of which includes the nine divided images Dp (see FIG. 4B and FIG. 5B).

The controller 11 causes the first image outputter 15a, the second image outputter 15b, the third image outputter 15c, and the fourth image outputter 15d to output the generated group images P1 to P4, respectively. The first image outputter 15a outputs the group image P1 (image signal Dv1) to the display device 20A, the second image outputter 15b outputs the group image P2 (image signal Dv2) to the display device 20C, the third image outputter 15c outputs the group image P3 (image signal Dv3) to the display device 20E, and the fourth image outputter 15d outputs the group image P4 (image signal Dv4) to the display device 20G (see FIG. 6). Step S11 is an example of divided image generation and first image output of the present disclosure.

Next, in Step S12, the controller 21 of each display device 20 acquires the group image P. For example, the controller 21 of the display device 20A acquires the group image P1 from the video output device 10, and the controller 21 of the display device 20B acquires the group image P1 from the display device 20A (see FIG. 7A and FIG. 7B). The controller 21 of the display device 20C acquires the group image P1 from the display device 20B and acquires the group image P2 from the video output device 10 (see FIG. 7C).

Next, in Step S13, the controller 21 of each display device 20 determines the display positions of the plurality of divided images Dp (see FIG. 4A and FIG. 5A). Specifically, the controller 21 determines the display position of each divided image Dp included in the group image P by referring to the above display position information assigned to each divided image Dp. Herein, each controller 21 determines the display position on the basis of the display position information assigned to each of the nine divided images Dp included in the input group image P.

Next, in Step S14, the controller 21 of each display device 20 extracts the four divided images Dp to be displayed from the group image P on the basis of the determined display positions, and rearranges the extracted divided images in accordance with the divided display areas of the display device 20, and generates a single synthesized image.

For example, as illustrated in FIG. 7A, the controller 21 of the display device 20A extracts, from the nine divided images Dp included in the group image P1, the four divided images Dp to which the above display position information "1" to "4" are assigned, and generates a single synthesized image. Similarly, as illustrated in FIG. 7B, the controller 21 of the display device 20B extracts, from the nine divided images Dp included in the group image P1, the four divided images Dp to which the above display position information "5" to "8" are assigned, and generates a single synthesized image. As illustrated in FIG. 7C, the controller 21 of the display device 20C extracts, from the nine divided images Dp included in the group image P1, the one divided images Dp to which the above display position information "9" is assigned, extracts, from the nine divided images Dp included in the group image P2, the three divided images Dp to which the above display position information "1" to "3" are assigned, and generates a single synthesized image. Step S14 is an example of a synthesized image generation step of the present disclosure.

Next, in Step S15, the controller 21 of each display device 20 displays the generated synthesized image on the display 24. Step S15 is an example of a display step of the present disclosure.

Next, in Step S16, the controller 21 of each display device 20 determines whether or not there is the display device 20 in the latter stage. When there is the display device 20 in the latter stage (Yes in S16), the process shifts to Step S17. When there is no display device 20 in the latter stage (No in S16), the process ends.

In Step S17, the controller 21 of each display device 20 outputs the group image (image signal Dv) for the display device 20 in the latter stage. For example, the controller 21 of the display device 20A outputs, to the display device 20B in the latter stage, the image signal Dv1 input from the video output device 10. The controller 21 of the display device 20B outputs, to the display device 20C in the latter stage, the image signal Dv1 input from the display device 20A. The controller 21 of the display device 20C outputs, to the display device 20D in the latter stage, the image signal Dv2 among the image signal Dv1 input from the display device 20 in the former stage and the image signal Dv2 input from the video output device 10 (see FIG. 6). Step S17 is an example of the second image output step.

The above Steps S12 to S17 are performed in each display device 20 in the same manner for each display device 20. Consequently, a single video content having high resolution is displayed on the whole of the display devices 20A to 20I.

As described above, in the display system 100 of this embodiment, the video output device 10 divides the video content (specific image) into a plurality of the divided images Dp in accordance with the number of the plurality of display devices 20, groups the plurality of divided images Dp into a plurality of groups, generates a plurality of the group images P, and outputs each of the plurality of generated group images P to the predetermined display device 20 among the plurality of display devices 20. The display device 20 outputs the second group image to the display device 20 in the latter stage when the first group image output from the video output device 10 and the second group image output from the display device 20 in the former stage are input. Each display device 20 extracts, from at least one of the first group image and the second group image, a plurality of the divided images Dp to be displayed by the corresponding display device 20, rearranges the extracted divided images in accordance with the divided display areas of the corresponding display device 20, generates a synthesized image, and displays the generated synthesized image.

In the display system 100, a plurality of the display devices 20 are daisy-chained, and at least two or more display devices 20 are connected to the video output device 10.

This makes it possible, for example, to display the video content having low resolution (for example, 8K: 7680×4320 pixels) on a plurality of the display devices 20 having low resolution (for example, 4K: 3840×2160 pixels). In addition, there is no need to use a dedicated device such as a distributor that distributes video signals output from the video output device 10, and therefore the system configuration does not become complicated and the cost is not increased. Accordingly, it is possible to provide a display system, a display method, and a recording medium recording a display program each capable of displaying a video content having high resolution on a plurality of display devices corresponding to low resolution without complicating a system configuration and without increasing a cost.

The display system 100 according to the present disclosure is not limited to the above configuration.

Figure 9A:
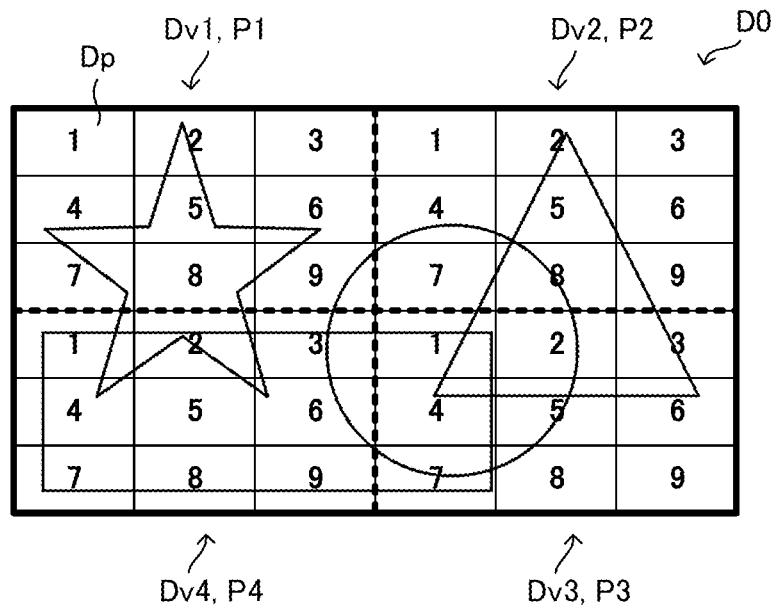
FIG. 9A is a diagram illustrating an example of divided images generated by a video output device according to another embodiment of the present disclosure.

As another embodiment of the present disclosure, for example, as illustrated in FIG. 9A, in a controller 11 of a video output device 10, a divided image generator 111 divides an image P0 corresponding to a video content into 36 segments, generates a group image P1 including nine divided images Dp at the upper left, a group image P2 including nine divided images Dp at the upper right, a group image P3 including nine divided images Dp at the lower right, and a group image P4 including nine divided images Dp at the lower left. Then, the controller 11 outputs the group image P1 (image signal Dv1) to a display device 20A, outputs the group image P2 (image signal Dv2) to a display device 20C, outputs the group image P3 (image signal Dv3) to a display device 20I, and outputs the group image P4 (image signal Dv4) to a display device 20G.

Figure 9B:
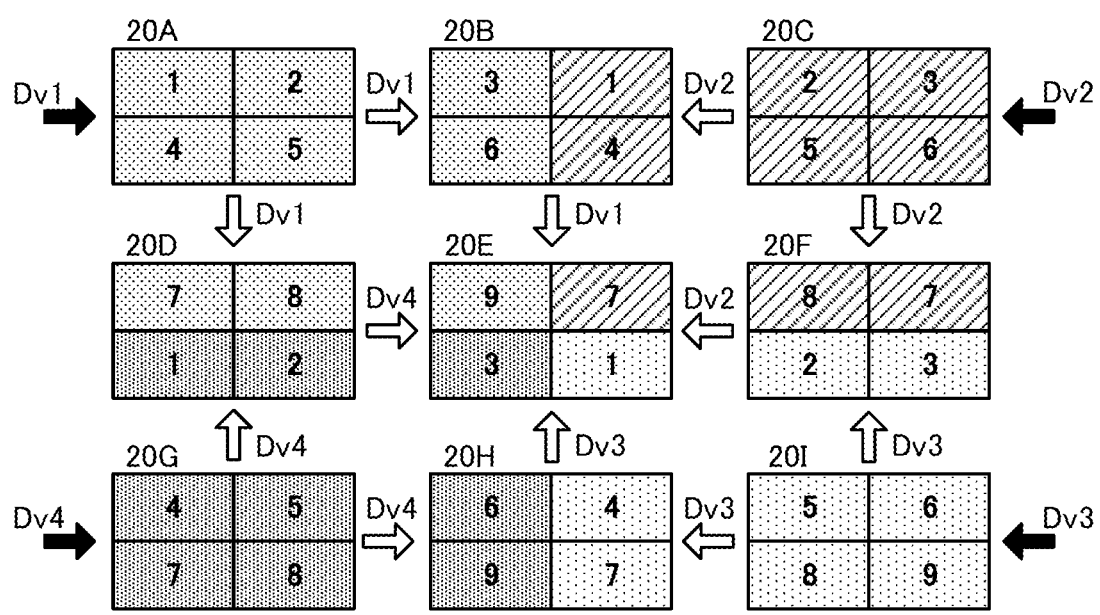
FIG. 9B is a diagram schematically illustrating a state of input/output of image signals in the display devices according to another embodiment of the present disclosure.

Herein, the nine display devices 20A to 20I are connected in an arrangement state illustrated in FIG. 9B. That is, each of the plurality of display devices 20 is connected to at least the two or more display devices 20, and at least the two or more display devices 20 are connected to the video output device 10. For example, the display device 20A outputs, to the display devices 20B and 20D, the image signal Dv1 input from the video output device 10. The display device 20C outputs, to the display devices 20B and 20F, the image signal Dv2 input from the video output device 10. The display device 20I outputs, to the display devices 20F and 20H, the image signal Dv3 input from the video output device 10. The display device 20G outputs, to the display devices 20D and 20H, the image signal Dv4 input from the video output device 10.

The display device 20B outputs, to the display device 20E, the image signal Dv1 input from the display device 20A. The display device 20D outputs, to the display device 20E, the image signal Dv4 input from the display device 20G. The display device 20F outputs, to the display device 20E, the image signal Dv2 input from the display device 20C. The display device 20H outputs, to the display device 20E, the image signal Dv3 input from the display device 20I. The display device 20E acquires the image signal Dv1 from the display device 20B, acquires the image signal Dv2 from the display device 20F, acquires the image signal Dv3 from the display device 20H, and acquires the image signal Dv4 from the display device 20D.

As illustrated in FIG. 9B, a controller 21 of the display device 20A extracts, from the nine divided images Dp included in the group image P1, the four divided images Dp to which display position information "1", "2", "4", and "5" are assigned, and generates a synthesized image. A controller 21 of the display device 20B extracts, from the nine divided images Dp included in the group image P1, the two divided images Dp to which the display position information "3" and "6" are assigned, extracts, from the nine divided images Dp included in the group image P2, the two divided images Dp to which the display position information "1" and "4" are assigned, and generates a synthesized image. A controller 21 of the display device 20C extracts, from the nine divided images Dp included in the group image P2, the four divided images Dp to which the display position information "2", "3", "5", and "6" are assigned and generates a synthesized image. A controller 21 of the display device 20D extracts, from the nine divided images Dp included in the group image P1, the two divided images Dp to which the display position information "7" and "8" are assigned, extracts, from the nine divided images Dp included in the group image P4, the two divided images Dp to which the display position information "1" and "2" are assigned, and generates a synthesized image. A controller 21 of the display device 20E extracts, from the nine divided images Dp included in the group image P1, the one divided image Dp to which the display position information "9" is assigned, extracts, from the nine divided images Dp included in the group image P2, the one divided image Dp to which the display position information "7" is assigned, extracts, from the nine divided images Dp included in the group image P3, the one divided image Dp to which the display position information "1" is assigned, extracts, from the nine divided images Dp included in the group image P4, the one divided images Dp to which the display position information "3" is assigned, and generates a synthesized image. Thus, each display device 20 generates the synthesized image, and causes a display 24 to display the synthesized image.

Consequently, a single video content having high resolution is displayed on the whole of the display devices 20A to 20I.

Figures 10A, 10B:
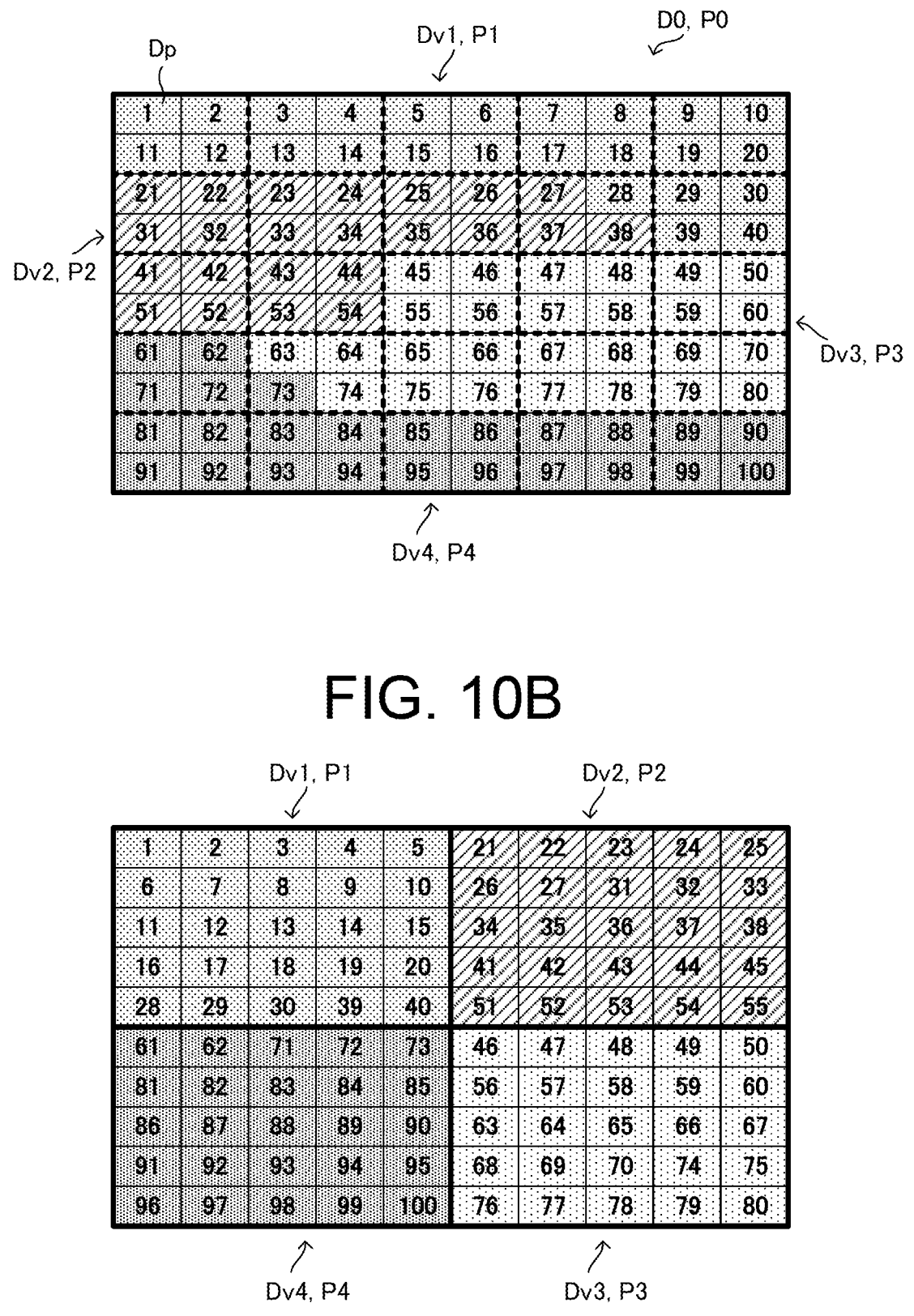
Figure 11:
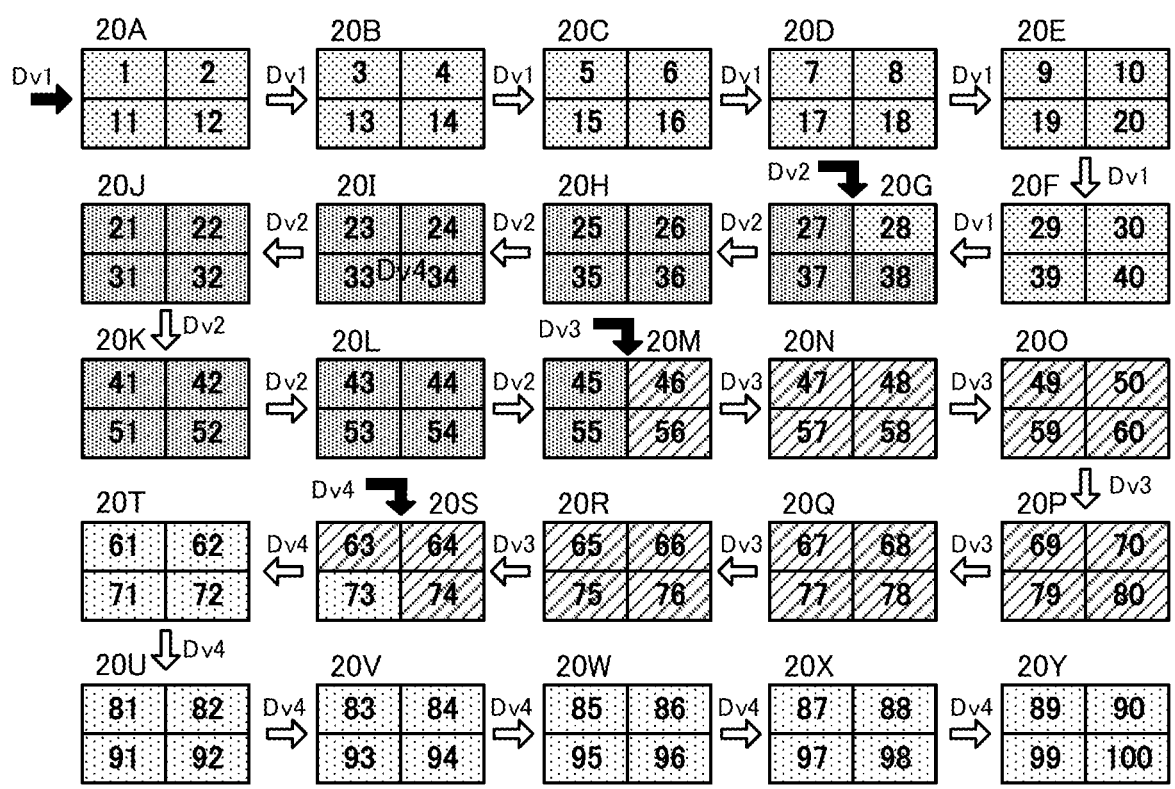
FIG. 11 is a diagram schematically illustrating a state of input/output of image signals in display devices according to another embodiment of the present disclosure.

In each of the above embodiments, the display system 100 includes the nine display devices 20. However, the present disclosure is not limited to this. As another embodiment, a display system 100 may include twenty-five display devices 20A to 20Y. The display devices 20A to 20Y are daisy-chained in this order, as illustrated in FIG. 11. Each display device 20 includes four divided display areas, and one divided image Dp is assigned to each divided display area. In this case, a controller 11 of a video output device 10 divides an image P0 corresponding to a video content into 100 segments (see FIG. 10A). Then, the controller 11 rearranges one hundred [100] divided images Dp, and generates four group images P1 to P4, each of which includes the twenty-five divided images Dp (see FIG. 10B).

As illustrated in FIG. 11, the controller 21 of the video output device 10 outputs the group image P1 (image signal Dv1) to the display device 20A, outputs the group image P2 (image signal Dv2) to the display device 20G, outputs the group image P3 (image signal Dv3) to the display device 20M, and outputs the group image P4 (image signal Dv4) to display device 20S.

The display device 20A outputs, to the display device 20B in the latter stage, the group image P1 (image signal Dv1) input from the video output device 10. The display device 20G outputs, to the display device 20H in the latter stage, the group image P2 among the group images P1 input from the display device 20F and the group image P2 (image signal Dv2) input from the video output device 10. The display device 20M outputs, to the display device 20N in the latter stage, the group image P3 among the group image P2 input from the display device 20L in the former stage and the group image P3 (image signal Dv3) input from the video output device 10. The display device 20S outputs, to the display device 20T in the latter stage, the group image P4 among the group image P3 input from the display device 20R in the former stage and the group image P4 (image signal Dv4) input from the video output device 10.

The controller 21 of each display device 20 extracts four divided images Dp to be displayed, on the basis of the above display position information assigned to each of the 25 divided images Dp included in the input group image P1, and rearranges each of the extracted divided images in accordance with the divided display area, and generates a single synthesized image. Then, the controller 21 of each display device 20 displays the generated synthesized image on the display 24. Consequently, a single video content having high resolution is displayed on the whole of the display devices 20A to 20Y.

In each of the above embodiments, the video output device 10 generates the plurality of group images P from the video content. However, the present disclosure is not limited to this. For example, the plurality of group images P may be generated from a video content in advance in a personal computer or the like, and the generated plurality of group images P may be input to a video output device 10. In this case, the video output device 10 outputs the plurality of group images P to the predetermined display device 20 in accordance with predetermined timing.

The display system of the present disclosure can be configured by freely combining each of the embodiments described above within the scope of the disclosure set forth in each claim, or by modifying or partially omitting each of the embodiments as appropriate.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

What is claimed is:

1. A display system that displays a specific image on a plurality of display devices by means of a plurality of image signals output from a video output device, the display system comprising:

a divided image generator that divides the specific image into a plurality of divided images according to the number of the plurality of display devices, groups the plurality of divided images into a plurality of groups, and generates a plurality of group images;

a first image output processor that outputs, to a predetermined one of the plurality of display devices, each of the plurality of group images generated by the divided image generator;

a second image output processor that outputs a second group image to one of the plurality of display devices on a latter stage when a first group image output from the video output device by the first image output processor and the second group image output from one of the plurality of display devices on a former stage are input;

a synthesized image generator that extracts, from at least one of the first group image and the second group image, a plurality of the divided images to be displayed by a corresponding one of the plurality of display devices, rearranges each of the extracted divided images in accordance with a divided display area of the corresponding one of the plurality of display devices, and generates a synthesized image; and a display processor that displays the synthesized image generated by the synthesized image generator, wherein in each of the plurality of display devices in which the first group image output from the video output device by the first image output processor, and the second group image output from the one of the plurality of display devices in the former stage are input, the synthesized image generator generates the synthesized image by means of a part of the divided images included in the first group image and a part of the divided images included in the second group image.

2. The display system according to claim 1, wherein the synthesized image generator extracts, from the plurality of divided images included in the first group image, one or a plurality of the divided images to which display position information corresponding to the corresponding one of the plurality of display devices is assigned, extracts, from the plurality of divided images included in the second group image, one or a plurality of the divided images to which the display position information corresponding to the corresponding one of the plurality of display devices is assigned, rearranges the extracted divided images to positions assigned to a plurality of the divided display areas of the corresponding one of the plurality of display devices, and generates the synthesized image.

3. The display system according to claim 1, wherein the plurality of display devices are daisy-chained, and at least two of the plurality of display devices are connected to the video output device.

4. The display system according to claim 1, wherein each of the plurality of display devices is connected to at least two of the plurality of display devices, and at least two of the plurality of display devices are connected to the video output device.

5. The display system according to claim 1, wherein the video output device includes four output terminals connected to four respective ones of the plurality of display devices different from each other, and the first image output processor causes the four output terminals to outputs respectively the plurality of group images.

6. The display system according to claim 1, wherein the video output device outputs the specific image having a first resolution, and each of the plurality of display devices displays an image having a second resolution lower than the first resolution.

7. The display system according to claim 6, wherein the divided image generator divides the specific image into the plurality of divided images having a third resolution lower than the second resolution, groups the plurality of divided images into the plurality of groups, and generates the plurality of group images having the second resolution.

8. A display method for displaying a specific image on a plurality of display devices by means of a plurality of image signals output from a video output device, the display method for causing one or a plurality of processors to execute:

dividing the specific image into a plurality of divided images according to the number of the plurality of display devices, grouping the plurality of divided images into a plurality of groups, and generating a plurality of group images;

first image outputting of outputting, to a predetermined one of the plurality of display devices, each of the plurality of group images generated in the divided image generation;

second image outputting of outputting a second group image to one of the plurality of display devices on a latter stage when a first group image output from the video output device in the first image outputting and the second group image output from one of the plurality of display devices on a former stage are input;

extracting, from at least one of the first group image and the second group image, a plurality of the divided images to be displayed by a corresponding one of the plurality of display devices, rearranging each of the extracted divided images in accordance with a divided display area of the corresponding one of the plurality of display devices, and generating a synthesized image; and displaying the synthesized image generated in the synthesized image generation, wherein in each of the plurality of display devices in which the first group image output from the video output device in the first image outputting, and the second group image output from the one of the plurality of display devices in the former stage are input, the synthesized image is generated by means of a part of the divided images included in the first group image and a part of the divided images included in the second group image.

9. A non-transitory computer readable recording medium that records a display program that displays a specific image on a plurality of display devices by means of a plurality of image signals output from a video output device, the display program for causing one or a plurality of processors to execute:

dividing the specific image into a plurality of divided images according to the number of the plurality of display devices, grouping the plurality of divided images into a plurality of groups, and generating a plurality of group images;

first image outputting of outputting, to a predetermined one of the plurality of display devices, each of the plurality of group images generated in the divided image generation;

second image outputting of outputting a second group image to one of the plurality of display devices on a latter stage when a first group image output from the video output device in the first image outputting and the second group image output from one of the plurality of display devices on a former stage are input;

extracting, from at least one of the first group image and the second group image, a plurality of the divided images to be displayed by a corresponding one of the plurality of display devices, rearranging each of the extracted divided images in accordance with a divided display area of the corresponding one of the plurality of display devices, and generating a synthesized image; and displaying the synthesized image generated in the synthesized image generation, wherein in each of the plurality of display devices in which the first group image output from the video output device in the first image outputting, and the second group image output from the one of the plurality of display devices in the former stage are input, the synthesized image is generated by means of a part of the divided images included in the first group image and a part of the divided images included in the second group image.

\* \* \* \* \*